Aug. 13, 1957 C. E. SLAUGHTER 2,802,593
SELF-SEALING CLOSURES
Filed Oct. 28, 1952
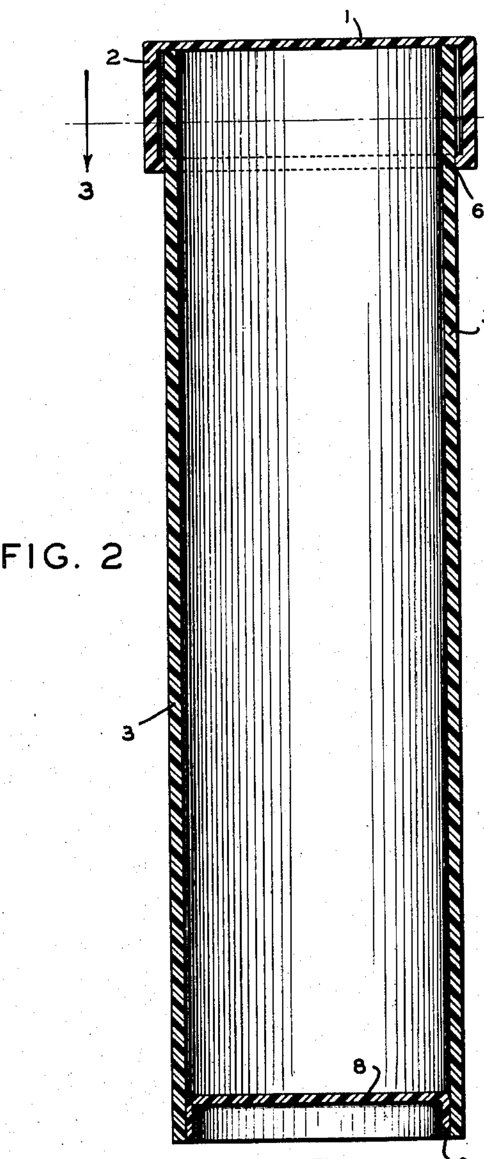
FIG. 2
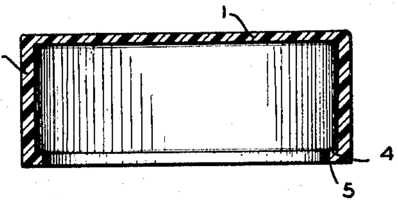
FIG. 1
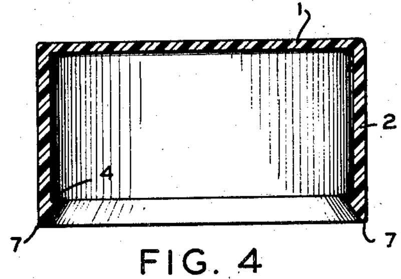
FIG. 4
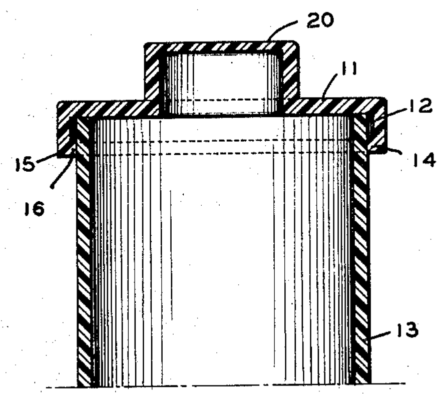
FIG. 5
FIG. 3
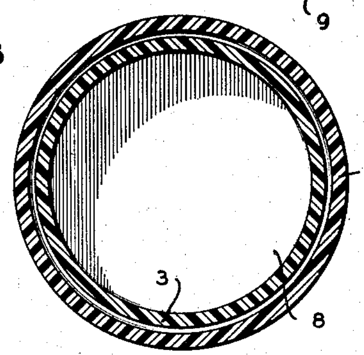
INVENTOR
CHARLES E. SLAUGHTER
BY Sol Shappirio
ATTORNEY United States Patent Office 2,802,593

Patented Aug. 13, 1957

2,802,593

SELF-SEALING CLOSURES

Charles E. Slaughter, Norwalk, Conn., assignor to Extruded Plastics, Inc., a corporation of Connecticut Application October 28, 1952, Serial No. 317,216

1 Claim. (Cl. 220—42)

This invention relates to plastic containers and closures, to sealing the closures to the containers, and to the resulting articles.

At the present time there are two standard methods of drawing thermoplastic sheets for the production of such things as closures. In one method the sheet is heated to the "plasticizing" temperature with the sheet ductile, but will not sag materially by gravity. It is then drawn to shape and chilled etc., in order to hold its shape.

The more usual method is to cut a sheet of thermoplatic to the desired size, then place the cold sheet in a special press and this sheet, except for the center part where the male die will operate, is pre-heated by close contact with upper and lower pressure plates. The center of the sheet, of course, remains cool. When the plastic has reached the ductile state, the male punch comes down and drops the heated plastic sheet into the die. There is just sufficient pressure on the plates to prevent the sheet from wrinkling and all this material is drawn into the walls of the die. The result is to obtain a closure with equal thickness in wall, rim and top. Production is, of course, slow, since each sheet must be locally heated "in situ."

The production of containers from thermoplastic tubing and covers therefor, have offered considerable difficulty in the art. Variation in tolerances, result in loose fitting closures which do not remain on the tubing or tubular container to which the closure is applied, or result in covers too small to be applied. Other difficulties have been experienced in attempting to seal the closure to the container. And methods of manufacture heretofore available for making a substantially rigid type of thermoplastic closure have not been satisfactory because they have been uneconomical.

The sealing of closures on containers has for the most part offered difficulty in the prior art. Containers are made, today, from the synthetic plastics such as cellulosic resins. This type of resin has an appreciable water absorption and as a result there is a marked expansion and contraction under varying degrees to humidity. Further, the material is subject to "cold flow" so that under the action of heat and pressure even normal atmospheric temperature of 70° F. the plastic is subject to deformation. The usual manner of closing a thin walled plastic container has been with a push-in type of closure which may be made by injection molding. Because of the "cold flow" the closure will not stay tightly in position after a few days of changing humidity. Attempts to seal the closure in place have been unsatisfactory with but one exception. Usually the methods are slow, require hand operation, generally result in considerable deterioration of or in injury to the container, and frequently do not give tight seals. This has been true as to methods using solvents or cements as well as those using electrical heat sealing.

An exception to the unsatisfactory prior art practice has been the present inventor's development where the closure carried a bead internally on the depending flange of the closure near the peripheral edge thereof which bead in contact with the container provided a capillary space between the bead and the closure into which solvent or cement could be positioned by capillary action.

Among the objects of the present invention is the temporary sealing of closures on containers without use of solvents, cements, or electronics.

Other objects include the production of plastic closures that may be applied to tubing or tubular containers effectively to produce tight seals with "run of the mill" tubing and closures.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In connection with that more detailed description, there is shown by way of illustration in the accompanying drawings, in Figure 1, a transverse section through a plastic closure produced in accordance with the present invention; in Figure 2, a transverse section through a tubular container carrying a closure produced in accordance with the present invention; in Figure 3, a section of line 3—3 of Figure 2; in Figure 4, a transverse section through a modified form of closure; in Figure 5, a transverse section through a modified form of container.

In accordance with the present invention, a synthetic resinous plastic container carries a closure therefor of substantially the same plastic material as the container, the closure and container being sealed together at their contacting areas by an unbalanced percentage of plasticizer contained in the synthetic resins. By having an amount of plasticizer in either the container stock or the closure stock, in excess of that in the plastic stock of the other, in contact, plasticizer will migrate from one of the elements to the other to give a self-sealing joint. Desirably the contact between the elements is along a narrow peripheral area or line as by a peripheral or circumferential bead, in order to exert the necessary concentrated pressure, and the self-sealing thus takes place along a line or limited area contact. Articles packaged in such containers are adequately protected, yet the seal may be readily broken by twisting the closure but replacement of the closure will still give a good seal. A few thousandths of an inch width, on the rim of the cap for example, in contact with the flat surface of the container exerts the pressure which causes localized migration and thereby the self-seal.

The plastic materials that may be used may vary widely and include plasticized stock made from any thermoplastic material, particularly thermoplastic synthetic resins including cellulose derivatives such as the esters and ethers for example, cellulose acetate, cellulose acetate butyrate, vinyl polymers and copolymers including polymerized vinyl acetate, and copolymers of vinyl chloride and vinyl acetate.

However as a general rule, the container and closure which are to be self-sealing should be of substantially the same plastic material but differing of course in plasticizer content. Good results are obtained by using cellulose acetate closures on cellulose acetate containers, cellulose acetate butyrate closures on cellulose acetate butyrate containers, polyvinyl closures on polyvinyl containers, etc. For example, if the closure is made from a "medium soft" grade of cellulose acetate butyrate ("Tenite II") and the container is made of "hard" cellulose acetate butyrate ("Tenite II"), and particularly the contact between the closure and the container is along an internal bead on the closure, the bead on the closure will seal on the container.

The time for producing the self-seal will vary with a number of factors including content of plasticizer, differential of plasticizer content, character of plastic stock and placticizer, temperature, time of contact, area of pressure contact, etc. For example "Tenite II" closures of medium soft flow carrying 16% plasticizer on "Tenite II" containers of "H flow" carrying 7½% plasticizer will give a tight self-seal within 36 hours, the time being much less on a hot day. With acetate, closures from stock designated "medium soft flow" and having about 52% plasticizer, may be used with containers from stock designated "$H_2$ flow" having about 34½% plasticizer. The stated amounts of plasticizer content are exemplary only. The differential may vary substantially. The higher the differential, the quicker the seal, all other factors remaining the same. All that is required is that the differential of plasticizer content should be sufficient to give sealing within the desired time prior to use. The closures and container may be stored separately until the latter are filled and then topped by the closures.

If it is desired to prevent self-sealing one or the other of the elements may be dusted with a powder such as a metallic soap like stearate or given a slight coat of oil or in any other way to prevent contact that results in plasticizer migration.

Because the invention is particularly applicable to closures having an internal peripheral or circumferential bead which intimately contacts the container walls, the following is given with respect to such disclosures. Plastic closures are produced provided with a cover portion having an integral depending peripheral flange, which flange is of a size to telescope over the tubular container or article to which the closure is to be applied. The flange is provided with an internal bead near the peripheral edge of the flange, which bead is of slightly smaller diameter at its greater depth than the tubular container or article to which the closure is to be applied so that a close contact is obtained. Another portion of the bead is slightly larger in diameter than the tubular container to which the closure is to be supplied so that when the closure is placed over the tubular article or container a tight seal is formed over an annular area of narrow width holding the closure securely in position on the end of the tubular article or container; but the seal is of such character that it may be readily sheared in order to enable the closure to be removed from the container. While the bead alone is sufficient to hold the closure tightly in position on the container when made of a size for that purpose and will actually force itself into the material or the tubular article slightly, the plasticizer differential feature gives an excellent self-seal of the greatest value in protecting articles of merchandising while displayed in stores, etc.

Another advantage of the self-seal is the following. There is always the danger of a cap or closure of the slip-on type being forced off under shock from the contents of the container. This is especially true during transportation. The self-seal prevents such separation of closure from container even where line contact of not more than about .010" in width is made.

It is important to note that the seal obtained is not a weld in the sense of that obtained when using a solvent such as acetone. It is more of an adhesion or "sticking together" brought about by migration accentuated possibly by the pressure generated by the line contact between the beaded element in contact with the other element of the container.

The closure is an integral one-piece plastic closure comprising a cover portion and continuous peripheral flange integral with said cover portion, the flange having a bead internally of said flange near its peripheral edge.

As shown in Figure 1, the closure comprises a cover portion 1 having a continuous peripheral straight-walled flange 2 integral with and depending from the cover portion 1. The flange is made of a diameter so that it is adapted to telescope over the end of a tubular article 3. The flange is provided with a solid bead 4 internally of said flange 2 near the peripheral edge thereof. The bead is integral with said flange and is made of the same plastic as the flange. The bead 4 at its greatest depth 5 is of slightly smaller diameter than the tubular container 3 to provide close contact therewith, but the bead 4 otherwise is slightly larger in diameter than the outer diameter of the tubular container 3 to provide a capillary space 6 between the last named portion of the bead and the outer wall of the tubular article 3.

The inner edge of the bead 4 may take any desired contour to provide the structure set forth above. Desirably in cross-section, this portion of the bead will be curved inwardly and thus may be semi-circular, oval, or otherwise having the shape of a conic section, or other desired curved contour; or it may be angular to provide a "point" contact at its smallest diameter with the outer wall of the container 3. As shown it may desirably be more or less semi-circular in shape.

Another form of closure is shown in Figure 4 which is substantially the same as that of Figure 2 except that in this case the bead 4 tapers down to a rather sharp edge 7 at the periphery of the flange 2. This enables the closure to be readily placed in position on the container, particularly in packaging and closing operations employing automatic machinery.

The closure is desirably and economically produced by a drawing operation from a sheet of plastic of the desired width so that the cover portion 1, flange 2 and bead 4 are all integral and made of the same plastic. By producing the closure from plastic sheets drawn in the manner described, it is simple matter to make the cover portion very thin since generally it does not require any great degree of rigidity or strength, while at the same time, a comparatively heavier side wall producing the flange is formed in the drawing operation. The flange side wall may be from 25% to 100% heavier or thicker than the cover portion. The internal bead may be of any desired size but desirably is from 10% to 20% thicker at its maximum point than the flange portion itself. In addition to other functions, the internal bead serves as a reinforcing strengthening element for the flange side wall.

The closure has generally the same cross-sectional contour as that of the tubular article or container or tubing to which it is to be applied and is readily placed over the unclosed end of such tubing or tubular container or tubular article and will be held tightly in position because of the close contact between the internal edge 5 of the bead with the outer wall of the container 3. The self-sealing takes place as explained above upon contact of the beaded closure and container.

The other end of the tubing may be sealed with a closure identical with that described above, or may take the form of a container as shown in Figure 2 in which a closure 8 of disc-like character having a peripheral flange 9 is positioned within the tubing forming the article 3 and held in position by sealing as by solvent or cement or electronic sealing operations.

While the closure is illustrated in the form of a circular article in cross-section having a disc-like cover portion, used in connection with tubing that is round in cross-section, the closures and tubing or tubular article or tubular container may take any desired cross-section and may be oval, hexagonal, square, etc. In such cases, of course, the closure will be made of a contour to fit the particular type of tubing utilized in the fabrication of the containers.

The thermoplastic materials may be dyed or pigmented in any desired way to produce any desired color, and the closure may be of a contrasting color to that of the tubular article or container.

A modified form of container is shown in Figure 5 which may be used as a powder container. In this case the closure 11 has a continuous peripheral straight-walled flange 12 integral with and depending from the cover portion 11. The flange 12 is of a diameter to telescope over the end of the tubular article or body portion 13. The flange 12 carries a solid bead 14 internally of the flange near the peripheral edge thereof. The bead 14 is integral with flanges 12 and made of the same plastic. The bead 14 at its greatest depth 15 is of slightly smaller diameter than the tubular container 13 to provide a capillary space 16 between the last named portion of the bead and the outer wall of the tubular article 13. The considerations set forth above for bead 4 apply also to bead 14. The other end of the article 13 may be closed by closure 17 having peripheral flange 18 as explained above for closure 7, Figure 2. The closure 11 is shown provided with a projection 20 integral with the closure 11 desirably formed therein in the same operation in which the closure is produced. The end 20 may be perforated if desired.

Closures of the character herein set forth are readily and economically produced by drawing operation from strips of plastic sheet material to yield closures that "lock" themselves in position on the container. The peripheral bead "pinches" into the material of the container body wall and in some cases will even produce a groove therein. When produced, the closure or cap is produced with the thickness of the plastic in the top, flange and bead portions as described above, as for example within the limits there set forth. Thus a closure of diameter for example of from 1" to 2½" may have a top as thin as .012" with a side wall or flange thickness of from .018" to .024" for the .018" thick flange, and from .025" to .032" for the .024" thick flange. The flange and bead thicknesses may be varied as desired while retaining top thickness at a minimum.

Having thus set forth my invention, I claim:

A tubular plastic container carrying an integral one-piece synthetic resinous plastic closure comprising a cover portion and a continuous peripheral straight-walled flange integral with and depending from said cover portion, which flange is telescoped over the end of the tubular container, said flange having a solid bead internally of said flange near the peripheral edge thereof, which bead is integral with said flange; is made of the same plastic as said flange, is, at its greatest depth, of slightly smaller diameter than the tubular container to provide close contact therewith, the closure composition having plasticizer in excess of that in the composition of the container whereby in line contact plasticizer will migrate to seal the closure firmly on the container along the bead line of contact of closure and container, but permitting ready separation of closure and container when desired.

References Cited in the file of this patent

UNITED STATES PATENTS

| | | |
|---|---|---|
| 1,918,987 | Seabold | July 18, 1933 |
| 2,064,042 | Von Till | Dec. 15, 1936 |
| 2,176,997 | Marini | Oct. 24, 1939 |
| 2,189,955 | Hokerk | Feb. 13, 1940 |
| 2,285,220 | Morrell | June 2, 1942 |
| 2,401,318 | Robinson et al. | June 4, 1946 |
| 2,536,773 | Saidel | Jan. 2, 1951 |
| 2,584,095 | Slaughter | Jan. 29, 1952 |